US009332231B2

(12) United States Patent
Lee et al.

(10) Patent No.: US 9,332,231 B2
(45) Date of Patent: May 3, 2016

(54) VEHICLE AND METHOD FOR MONITORING SAFE DRIVING

(71) Applicant: Zijilai Innovative Services Co., Ltd., Shenzhen (CN)

(72) Inventors: Hou-Hsien Lee, New Taipei (TW); Chang-Jung Lee, New Taipei (TW); Chih-Ping Lo, New Taipei (TW)

(73) Assignee: Zijilai Innovative Services Co., Ltd., Shenzhen (CN)

( * ) Notice: Subject to any disclaimer, the term of this patent is extended or adjusted under 35 U.S.C. 154(b) by 292 days.

(21) Appl. No.: 14/068,048

(22) Filed: Oct. 31, 2013

(65) Prior Publication Data
US 2014/0139675 A1   May 22, 2014

(30) Foreign Application Priority Data
Nov. 19, 2012   (TW) .............................. 101143063 A

(51) Int. Cl.
*H04N 7/18* (2006.01)
*B60R 1/00* (2006.01)
*B60R 1/12* (2006.01)

(52) U.S. Cl.
CPC .. *H04N 7/18* (2013.01); *B60R 1/00* (2013.01); *B60R 2001/1253* (2013.01); *B60R 2300/308* (2013.01)

(58) Field of Classification Search
CPC .................................... H04N 7/18; B60R 1/00
USPC .......................................................... 348/148
See application file for complete search history.

(56) References Cited

U.S. PATENT DOCUMENTS

2014/0169627 A1*  6/2014  Gupta ................ G06K 9/00805
382/103

* cited by examiner

*Primary Examiner* — Sath V Perungavoor
*Assistant Examiner* — Jeffery Williams
(74) *Attorney, Agent, or Firm* — Novak Druce Connolly Bove + Quigg LLP

(57) ABSTRACT

In a method for monitoring safe driving of a vehicle, the method obtains a current image captured by an image capturing device positioned on an outside sideview mirror of the vehicle, determines a horizontal distance and a vertical distance between each pixel point in the current image and the lens of image capturing device, and selects a reference point from first specified pixel points whose horizontal distances are less than a first preset value. The method further determines second specified pixel points whose vertical distances are less than or equal to a second preset value based on the reference point, to obtains a processed image based on the second specified pixel points, and displays the processed image on an inside rearview mirror of the vehicle.

18 Claims, 6 Drawing Sheets

VEHICLE AND METHOD FOR MONITORING SAFE DRIVING

BACKGROUND

1. Technical Field

Embodiments of the present disclosure relate to safety monitoring technology, and particularly to a vehicle and method for monitoring safe driving of the vehicle.

2. Description of Related Art

Rearvision mirrors (e.g., outside sideview mirrors and inside rearview mirrors) are used to provide images behind or beside a moving vehicle. However, even when using both mirrors to observe the rear reflected image, there are blind spots, so that the driver may not see everything that is at the rear of the vehicle, which could result in a traffic accident. Therefore, an efficient method for monitoring driving safety of the vehicle is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
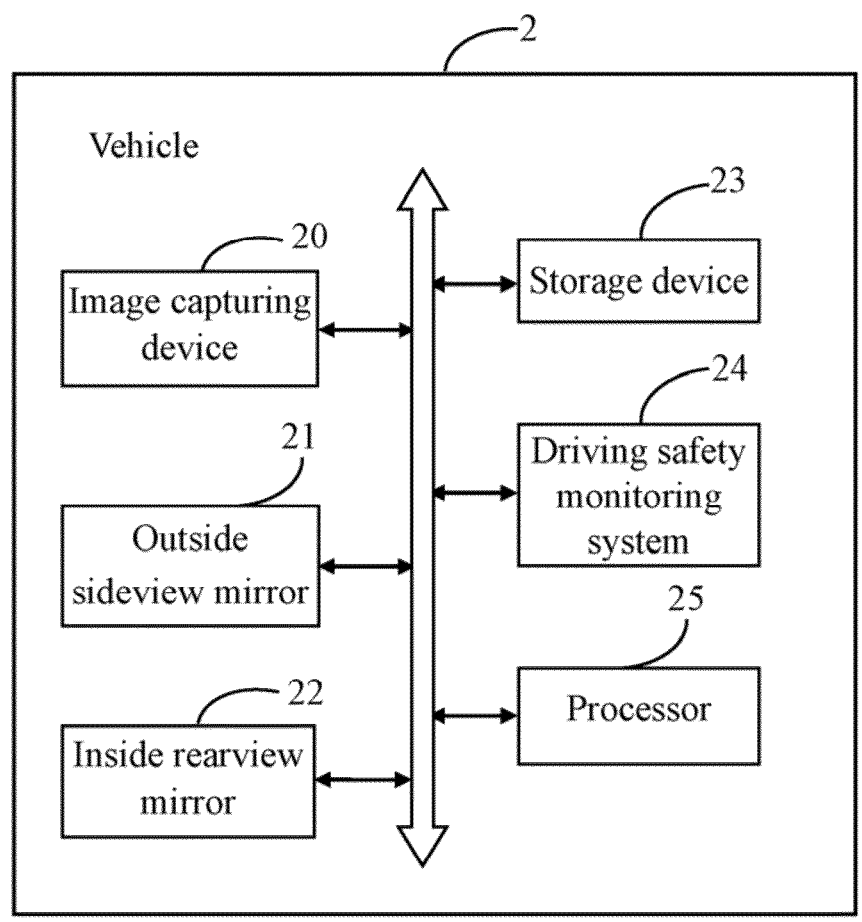
FIG. 1 is a block diagram of one embodiment of a vehicle including a driving safety monitoring system.

FIG. 1 is a block diagram of one embodiment of a vehicle 2 including a driving safety monitoring system 24. The vehicle 2 further includes a plurality of image capturing devices 20, a plurality of outside sideview mirrors 21, at least one inside rearview mirror 22, a storage device 23, and at least one processor 25. It should be understood that FIG. 1 illustrates only one example of the vehicle 2 that may include more or fewer components than illustrated, or a different configuration of the various components in other embodiments. For example, the vehicle 2 may further include a driving unit (e.g., a motor) and a power supply (e.g., a battery).

In one embodiment, the vehicle 2 may include two outside sideview mirrors 21 which are installed on a left side and a right side of a front part of the vehicle 2. An image capturing device 20 is positioned on each outside sideview mirror 21. For example, a first image capturing device is positioned on a bottom-right position of an outside sideview mirror 21 on a left side, and a second image capturing device is positioned on a bottom-left position of an outside sideview mirror 21 on a right side.

In one embodiment, the image capturing device 20 may be a depth-sensing camera, such as a time-of-flight (TOF) camera. In this embodiment, the image capturing device 20 is a camera system that captures a distance from a target object in a scene being captured to a lens of the image capturing device 20 (distance information) using the TOF principle, which can obtain a distance between the lens and each point on the target object which has been captured. Thus, each image captured by the image capturing device 20 includes distance information between the lens and each point on the target object in the image.

In one embodiment, the image capturing device 20 obtains a digital image of the areas at the rear of the vehicle at each preset time interval (e.g., 0.1 second), and stores the digital image in the storage device 23. The storage device 23 may be a smart media card, a secure digital card, a compact flash card, or any other memory storage device.

In one embodiment, a liquid crystal display (LCD) screen is embedded in the inside rearview mirror 22, and a metallic film (e.g., silver) is plated on the LCD screen. When the vehicle 2 is moving, the inside rearview mirror 22 may simultaneously display a reflected image at the rear of the vehicle and a digital image captured by the image capturing device 20 of the outside sideview mirror 21, so that a driver of the vehicle 2 may see the images in the blind spots of the rearview mirrors.

In one embodiment, the driving safety monitoring system 24 may include computerized instructions in the form of one or more programs that are executed by the processor 25 and stored in the storage device 23 (or memory). The driving safety monitoring system 24 detects a target object (e.g., a person) in the digital image, determines whether the detected target object is close to the vehicle 2, and displays the digital image of the detected target object on the LCD screen of the inside rearview mirror 22 when the detected target object is determined to be close to the vehicle 2. A detailed description of the driving safety monitoring system 24 will be given in the following paragraphs.

Figure 2:
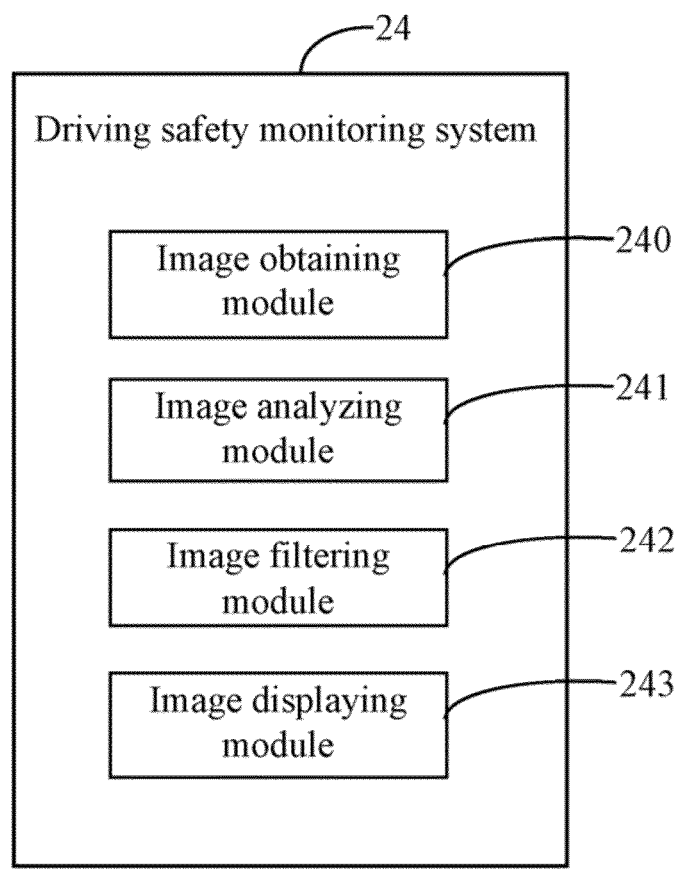
FIG. 2 is a block diagram of function modules of the driving safety monitoring system included in the vehicle.

FIG. 2 is a block diagram of function modules of the driving safety monitoring system 24 included in the vehicle 2. In one embodiment, the driving safety monitoring system 24 may include one or more modules, for example, an image obtaining module 240, an image analyzing module 241, an image filtering module 242, and an image displaying module 243. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
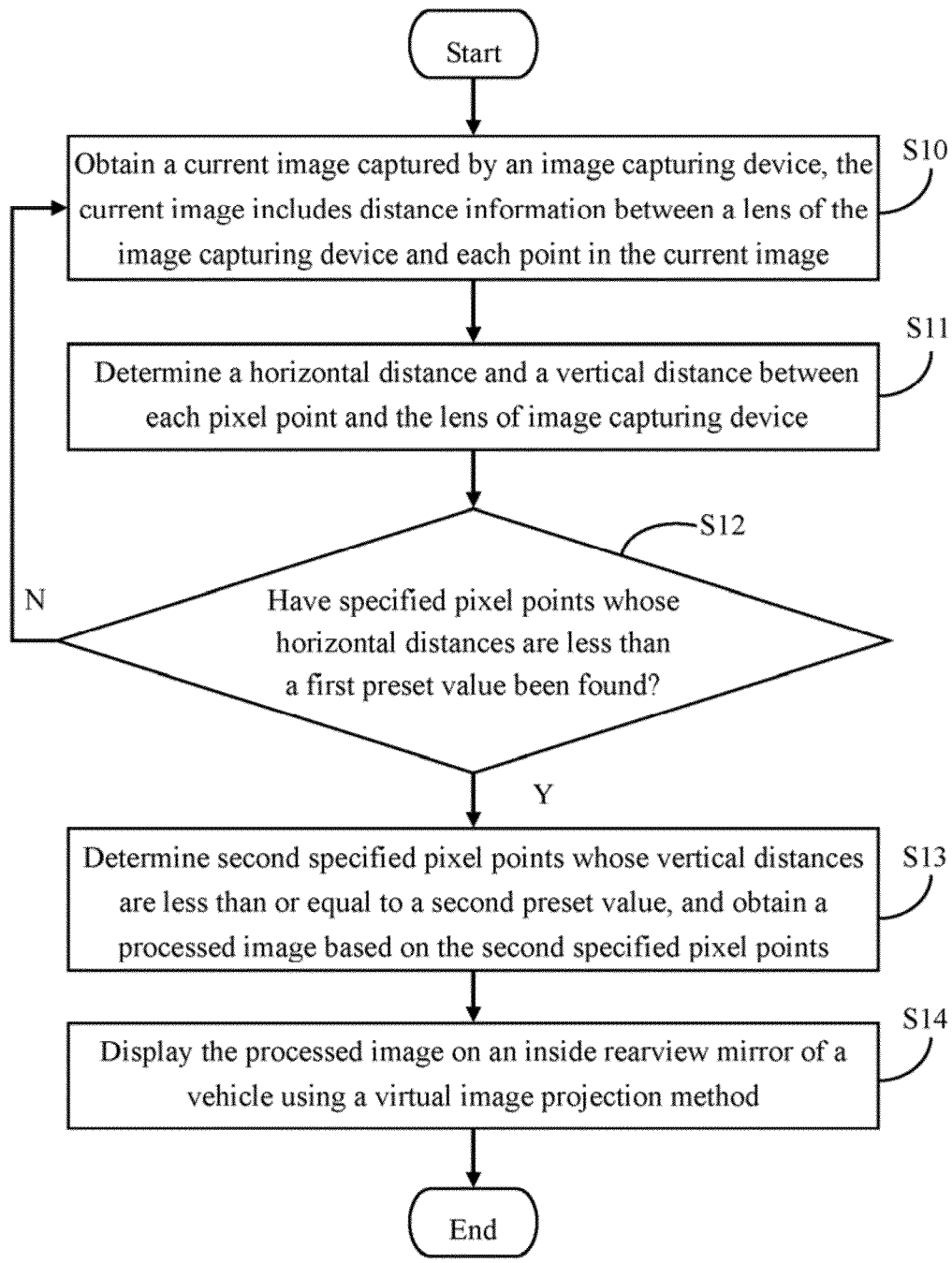
FIG. 3 is a flowchart of one embodiment of a method for monitoring safe driving of the vehicle.

FIG. 3 is a flowchart of one embodiment of a method for monitoring safe driving of the vehicle 2. Depending on the embodiment, additional steps may be added, others removed, and the ordering of the steps may be changed.

In step S10, the image obtaining module 210 obtains current digital images (hereinafter referred to as "current images") captured by the image capturing devices 20 positioned on the outside sideview mirrors 21 at each preset time intervals (e.g., one second). The current images may include a left image captured by the image capturing device 20 configured on the outside sideview mirror 21 on the left side, and a right image captured by the image capturing device 20 configured on the outside sideview mirror 21 on the right side. In this embodiment, one current image (e.g., the right image) captured by the image capturing device 20 positioned on one of the outside sideview mirrors 21 is illustrated as follows to explain the present disclosure. The current image includes distance information between the lens of the image capturing device 20 and each pixel point in the current image.

In step S11, the image analyzing module 241 determines a horizontal distance and a vertical distance between each pixel point in the current image and the lens of image capturing device 20. In one embodiment, the horizontal distance is an X-axis distance between each pixel point in the current image and the lens of image capturing device 20, and the vertical distance is a Y-axis distance between each pixel point in the current image and the lens of image capturing device 20. The vertical distance between the lens of the image capturing device 20 and each pixel point in the current image represents the vertical distance between the vehicle 2 and each pixel point in the current image. A detailed description is provided as follows.

Figure 4:
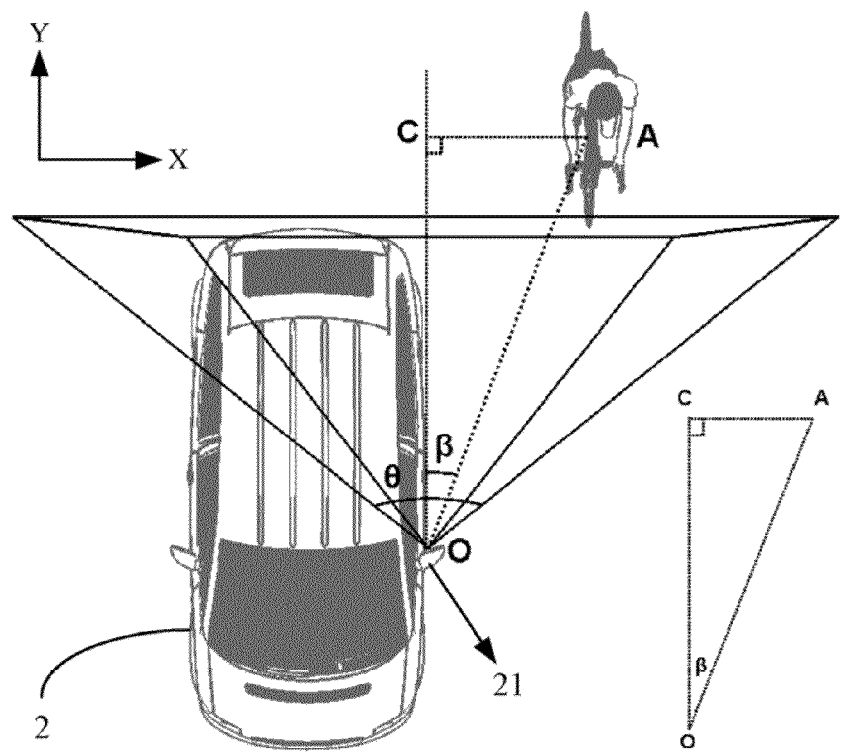
FIG. 4 and FIG. 5 are schematic diagrams for calculating a horizontal distance and a vertical distance between each pixel point of a current image and the vehicle.

FIG. 4 shows that "A" represents a pixel point in the current image, point "O" represents a position of the lens of the image capturing device 20, "OA" represents the distance between the pixel point "A" and the lens of the image capturing device 20, "CA" represents the left horizontal distance between the pixel point "A" and the lens of image capturing device 20, and "OC" represents the vertical distance between the pixel point "A" and the lens of image capturing device 20.

Figure 5:
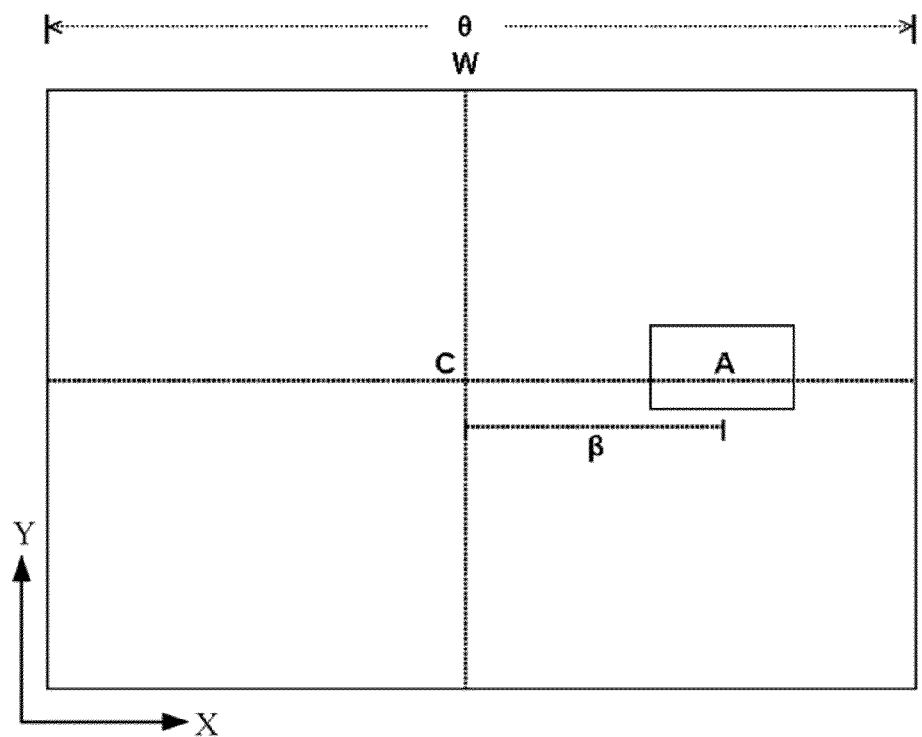

FIG. 4 shows that the distance "OA" is a known value, the left horizontal distance "CA" and the vertical distance "OC" may be calculated when the angle AOC($\beta$) is determined. FIG. 5 shows that the angle AOC($\beta$) may be determined according to a ratio between a length of "CA" in the current image and a width of the current image. FIG. 5 shows that "W" represents the width of the current image, "$\theta$" represents a fixed capture angle of the image capturing device 20, $\beta=\theta \times X1/W$, where "X1" represents the length of "CA" in the current image, the length of "CA" in the current image is determined as an X-axis coordinate of the pixel point "A" in the current image, and pixel point "C" represents an origin of a coordinate system of the current image.

After the angle "$\beta$" is determined, the vertical distance "OC" between the pixel point "A" and the lens of the image capturing device 20 may be calculated by using the formula "$OC=OA \times \cos(\beta)$", where "cos" is a cosine function. The left horizontal distance "CA" between the pixel point "A" and the lens of the image capturing device 20 is calculated by using the formula "$CA=OA \times \sin(\beta)$", where "sin" is a sine function.

In step S12, the image analyzing module 241 determines whether first specified pixel points whose horizontal distances are less than a first preset value (e.g., one meter) have been found in the current image. The horizontal distance of each pixel point in the current image is determined to be the horizontal distance between each pixel point in the current image and the lens of the image capturing device 20. If the first specified pixel points whose horizontal distances are less than the first preset value have not been found in the current image, the procedure returns to step S10. If the first specified pixel points whose horizontal distances are less than the first preset value have been found in the current image, the procedure goes to step S13.

In step S13, the image filtering module 242 selects a reference point from the first specified pixel points whose horizontal distances are less than the first preset value, determines second specified pixel points whose vertical distances are less than or equal to a second preset value based on the reference point, deletes residual pixel points whose vertical distances are greater than the second preset value, and obtains a processed image based on the second specified pixel points. The vertical distance of each pixel point in the current image is determined to be the vertical distance between each pixel point in the current image and the lens of the image capturing device 20.

The processed image includes a target object which is formed by the second specified pixel points, the target object is regarded as an object close to the vehicle 2. In one embodiment, the second preset value is equal to a vertical distance between the reference point and the lens of the image capturing device 20. In one embodiment, the reference point is determined as one of the first specified pixel points which has a minimum horizontal distance.

Figure 6:
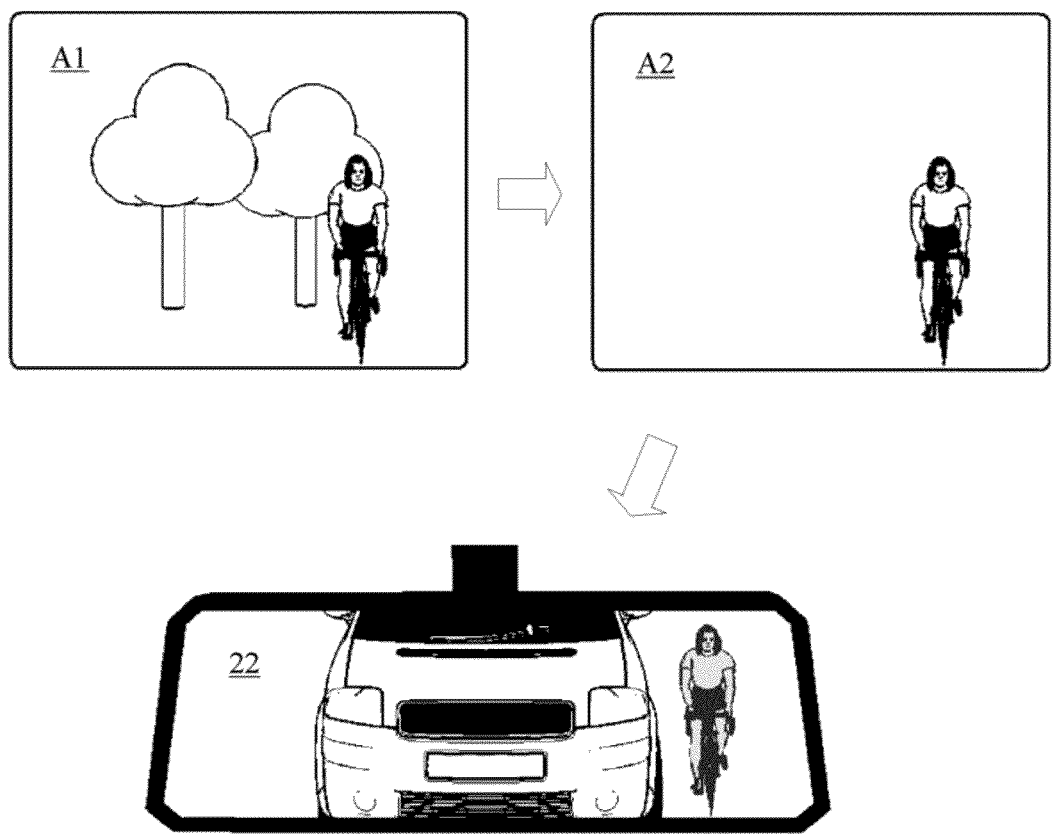
FIG. 6 is a schematic diagram for obtaining a processed image from the current image and displaying the processed image on an inside rearview mirror of the vehicle.

For example, suppose that the second preset value is three millimeters, the image filtering module 242 determines second specified pixel points whose vertical distances are less than or equal to three millimeters, deletes residual pixel points whose vertical distances are greater than three millimeters from the current image, to obtain a processed image including a target object of the second specified pixel points. As shown in FIG. 6, "A1" represents the current image beside the vehicle 2 captured by the image capturing device 20, and "A2" represents the processed image from the current image "A1".

In step S14, the image displaying module 243 displays the processed image on the inside rearview mirror 22 of the vehicle 2 using a virtual image projection method. The driver of the vehicle 2 may see a reflected image of the inside rearview mirror 22 at the rear of the vehicle 2 and a processed image captured by the image capturing device 20 of the outside sideview mirror 21 on the inside rearview mirror 22 at the same time, so that a blind spot of the outside sideview mirror 21 is removed.

In one embodiment, if the current image is captured by an outside sideview mirror 21 on the left side of the vehicle 2, the processed image is displayed on the left side of the inside rearview mirror 22. If the current image is captured by an outside sideview mirror 21 on the right side of the vehicle 2, the processed image is displayed on the right side of the inside rearview mirror 22.

In other embodiments, the image analyzing module 241 does not determine the horizontal distance and the vertical distance between each pixel point in the current image and the lens of image capturing device 20 (i.e., the step S11 is removed). The following steps are executed.

The image analyzing module 241 determines whether third specified pixel points whose distances are less than a third preset value (e.g., one meter) have been found in the current image. The distance of each pixel point in the current image is determined to be the distance between each pixel point in the current image and the lens of the image capturing device 20.

The image filtering module 242 selects a reference point from the third specified pixel points whose distances are less than the third preset value, determines fourth specified pixel points whose distances are less than or equal to a third preset value based on the reference point, deletes residual pixel points whose distances are greater than the third preset value, and obtains a processed image based on the fourth specified pixel points. In one embodiment, the third preset value is equal to a distance between the reference point and the lens of the image capturing device 20. In one embodiment, the reference point is determined as one of the third specified pixel points which has a minimum distance.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A computer-implemented method for monitoring safe driving of a vehicle, the method comprising:
obtaining a current image captured by an image capturing device positioned on an outside sideview mirror of the vehicle, the current image comprising distance information between a lens of the image capturing device and each pixel point in the current image;
determining a horizontal distance and a vertical distance between each pixel point in the current image and the lens of image capturing device;
selecting a reference point from first specified pixel points whose horizontal distances are less than a first preset value;
determining second specified pixel points whose vertical distances are less than or equal to a second preset value based on the reference point, deleting residual pixel points whose vertical distances are greater than the second preset value, and obtaining a processed image based on the second specified pixel points; and
displaying the processed image on an inside rearview mirror of the vehicle.

2. The method according to claim 1, wherein the inside rearview mirror is embedded with a liquid crystal display (LCD) screen, and a metallic film is plated on the LCD screen.

3. The method according to claim 1, wherein the reference point is determined as one of the first specified pixel points which has a minimum horizontal distance.

4. The method according to claim 1, wherein the second preset value is equal to a vertical distance between the reference point and the lens of the image capturing device.

5. The method according to claim 1, wherein the horizontal distance between each pixel point and the lens of the image capturing device is calculated by a formula of "OA×sin($\beta$)", $\beta=\theta\times X1/W$, "OA" representing the distance between each pixel point and the lens of the image capturing device, "$\theta$" representing a fixed capture angle of the image capturing device, "X1" representing an X-axis coordinate of each pixel point in the current image, and "W" representing a width of the current image.

6. The method according to claim 5, wherein the vertical distance between each pixel point and the lens of the image capturing device is calculated by a formula of "OA×cos($\beta$)".

7. A vehicle, comprising:
a processor;
a storage device storing a plurality of instructions, which when executed by the processor, causes the processor to:
obtain a current image captured by an image capturing device positioned on an outside sideview mirror of the vehicle, the current image comprising distance information between a lens of the image capturing device and each pixel point in the current image;
determine a horizontal distance and a vertical distance between each pixel point in the current image and the lens of image capturing device;
select a reference point from first specified pixel points whose horizontal distances are less than a first preset value;
determine second specified pixel points whose vertical distances are less than or equal to a second preset value based on the reference point, delete residual pixel points whose vertical distances are greater than the second preset value, and obtain a processed image based on the second specified pixel points; and
display the processed image on an inside rearview mirror of the vehicle.

8. The vehicle according to claim 7, wherein the inside rearview mirror is embedded with a liquid crystal display (LCD) screen, and a metallic film is plated on the LCD screen.

9. The vehicle according to claim 7, wherein the reference point is determined as one of the first specified pixel points which has a minimum horizontal distance.

10. The vehicle according to claim 7, wherein the second preset value is equal to a vertical distance between the reference point and the lens of the image capturing device.

11. The vehicle according to claim 7, wherein the horizontal distance between each pixel point and the lens of the image capturing device is calculated by a formula of "OA×sin($\beta$)", $\beta=\theta\times X1/W$, "OA" representing the distance between each pixel point and the lens of the image capturing device, "$\theta$" representing a fixed capture angle of the image capturing device, "X1" representing an X-axis coordinate of each pixel point in the current image, and "W" representing a width of the current image.

12. The vehicle according to claim 11, wherein the vertical distance between each pixel point and the lens of the image capturing device is calculated by a formula of "OA×cos($\beta$)".

13. A non-transitory storage medium having stored thereon instructions that, when executed by a processor of a vehicle, causes the vehicle to perform a method for monitoring safe driving of the vehicle, the method comprising:
obtaining a current image captured by an image capturing device positioned on an outside sideview mirror of the vehicle, the current image comprising distance information between a lens of the image capturing device and each pixel point in the current image;
determining a horizontal distance and a vertical distance between each pixel point in the current image and the lens of image capturing device;
selecting a reference point from first specified pixel points whose horizontal distances are less than a first preset value;
determining second specified pixel points whose vertical distances are less than or equal to a second preset value based on the reference point, deleting residual pixel points whose vertical distances are greater than the second preset value, and obtaining a processed image based on the second specified pixel points; and
displaying the processed image on an inside rearview mirror of the vehicle.

14. The non-transitory storage medium according to claim 13, wherein the inside rearview mirror is embedded with a liquid crystal display (LCD) screen, and a metallic film is plated on the LCD screen.

15. The non-transitory storage medium according to claim 13, wherein the reference point is determined as one of the first specified pixel points which has a minimum horizontal distance.

16. The non-transitory storage medium according to claim 13, wherein the second preset value is equal to a vertical distance between the reference point and the lens of the image capturing device.

17. The non-transitory storage medium according to claim 13, wherein the horizontal distance between each pixel point and the lens of the image capturing device is calculated by a formula of "OA×sin(β)", β=θ×X1/W, "OA" representing the distance between each pixel point and the lens of the image capturing device, "θ" representing a fixed capture angle of the image capturing device, "X1" representing an X-axis coordinate of each pixel point in the current image, and "W" representing a width of the current image.

18. The non-transitory storage medium according to claim 17, wherein the vertical distance between each pixel point and the lens of the image capturing device is calculated by a formula of "OA×cos(β)".

* * * * *